US010860670B2

(12) United States Patent
Guo et al.

(10) Patent No.: US 10,860,670 B2
(45) Date of Patent: Dec. 8, 2020

(54) FACTORED MODEL FOR SEARCH RESULTS AND COMMUNICATIONS BASED ON SEARCH RESULTS

(71) Applicant: Microsoft Technology Licensing, LLC, Redmond, WA (US)

(72) Inventors: Qi Guo, Sunnyvale, CA (US); Bo Hu, Mountain View, CA (US); Xianren Wu, San Jose, CA (US); Anish Ramdas Nair, Fremont, CA (US); Shan Zhou, San Jose, CA (US); Lester Gilbert Cottle, III, Millbrae, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 15/797,624

(22) Filed: Oct. 30, 2017

(65) Prior Publication Data

US 2019/0130037 A1  May 2, 2019

(51) Int. Cl.
*G06F 16/9535* (2019.01)
*G06N 7/00* (2006.01)
*G06N 20/00* (2019.01)
*G06F 16/9038* (2019.01)
*G06F 16/9536* (2019.01)

(52) U.S. Cl.
CPC ...... *G06F 16/9535* (2019.01); *G06F 16/9038* (2019.01); *G06F 16/9536* (2019.01); *G06N 7/005* (2013.01); *G06N 20/00* (2019.01)

(58) Field of Classification Search
None
See application file for complete search history.

(56) References Cited

U.S. PATENT DOCUMENTS

2017/0178031 A1*  6/2017  Zhu .................. G06N 20/00
2019/0050813 A1*  2/2019  Guo .................. G06F 16/9535

OTHER PUBLICATIONS

Neural Networks: Machine Learning Inspired by the Brain—https://www.upwork.com/hiring/data/neural-networks-demystified/ (Year: 2017).*
Getting started with Machine Learning https://www.geeksforgeeks.org/getting-started-machine-learning/ (Year: 2017).*

* cited by examiner

*Primary Examiner* — Hau H Hoang
(74) *Attorney, Agent, or Firm* — Schwegman Lundberg & Woessner, P.A.

(57) ABSTRACT

In an example embodiment, two machine learned models are trained. One is trained to output a probability that a searcher having a member profile in a social networking service will select a potential search result. The other is trained to output a probability that a member corresponding to a potential search result will respond to a communication from a searcher. Features may be extracted from a query, information about the searcher, and information about the member corresponding to the potential search result and fed to the machine learned models. The outputs of the machine learned models can be combined and used to rank search results for returning to the searcher.

20 Claims, 7 Drawing Sheets

US 10,860,670 B2

FACTORED MODEL FOR SEARCH RESULTS AND COMMUNICATIONS BASED ON SEARCH RESULTS

TECHNICAL FIELD

The present disclosure generally relates to computer technology for solving technical challenges in electronic communications. More specifically, the present disclosure relates to a factored machine learning model for returning search results that are likely to result in both selection by the searcher and return communication by subjects of the search results.

BACKGROUND

The rise of the Internet has given rise to two different, yet related, phenomena: the increase in the presence of social networks, with their corresponding member profiles visible to large numbers of people, and the increase in the desirability of reaching out to small groups of social network members who meet strict criteria. This is especially pronounced in the field of recruiting, where recruiters are typically attempting to find members with particular qualifications (e.g., education, experience, skills, etc.) and then generally the recruiters reach out to members with the particular qualifications to find out whether or not the members may be willing to apply for the job openings the recruiter has available.

Job solicitation communications, such as emails sent by recruiters to members who may be prospective job applicants, can take a lot of time on the part of the recruiters, especially if done effectively. Effective job solicitation communications generally include personalized information about the member and have the solicitation geared specifically towards that member, thus making it look less like a mass communication sent to many potential applications and more like the recruiter has specifically targeted the member. Recruiters, however, have a limited amount of time to spend in creating such job solicitation communications, and thus would benefit greatly if mechanisms were in place to reduce the likelihood that such time would be wasted. A technical problem arises, however, in determining whether a particular member, gauged from information available to a computer system, is likely to respond to a particular communication, and even if such a determination were feasible, how to utilize such information to reduce wasted resources.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
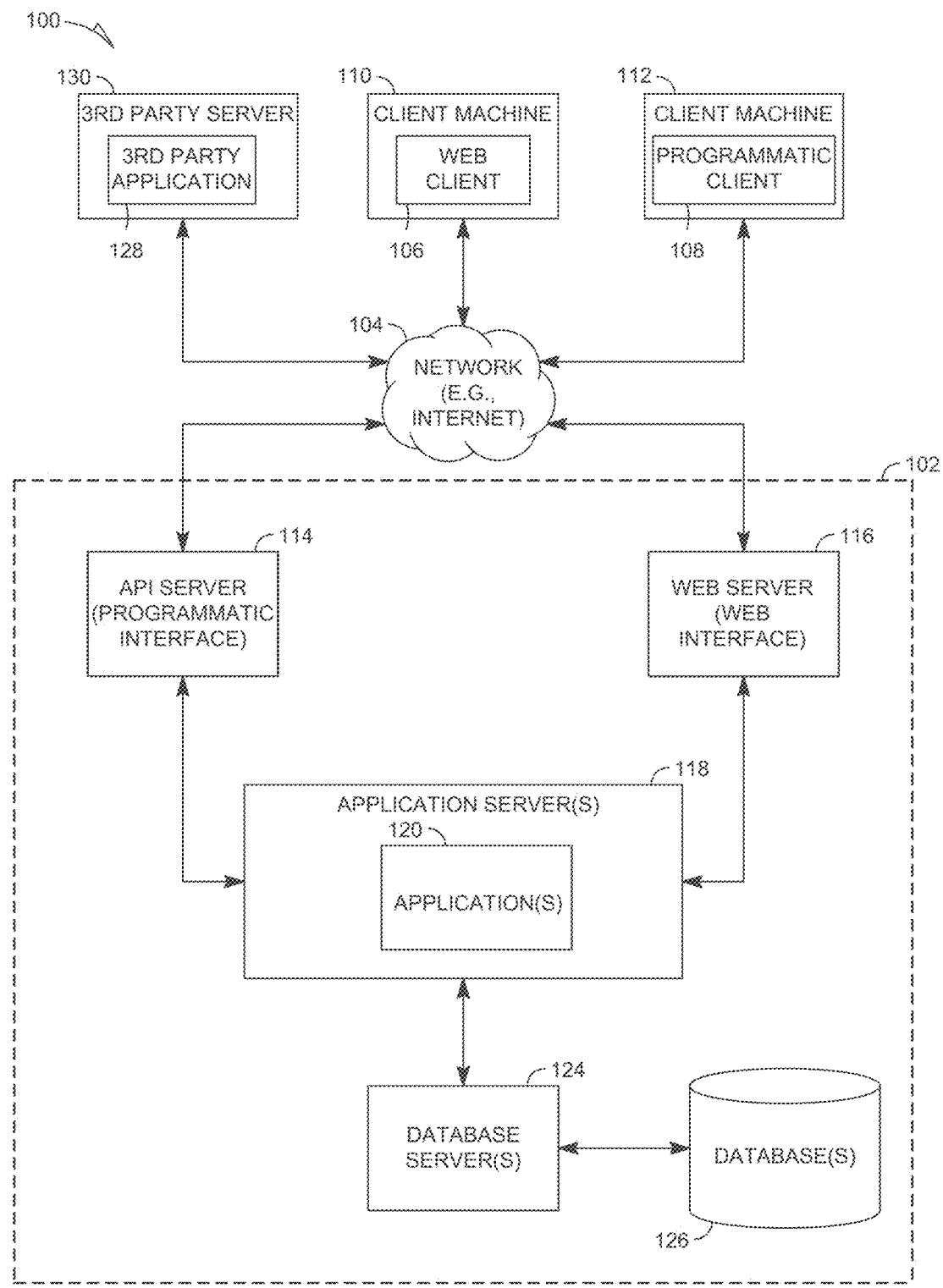
FIG. 1 is a block diagram illustrating a client-server system, in accordance with an example embodiment.

The present disclosure describes, among other things, methods, systems, and computer program products that individually provide functionality for one or more machine learning algorithm models. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a platform is provided that utilizes information available to a computer system to feed two different machine learned models. The first machine learned model is trained to determine the probability that a searcher would select a given potential search result if it was presented to him or her. The second machine learned model is trained to determine the probability that a subject of the potential search result would respond to a communication from the searcher. These probabilities can then be combined to determine whether to present the searcher with the potential search result and, if so, how high to rank the potential search result among other search results.

In some example embodiments, these techniques may be applied to search results that are member profiles or other content uniquely associated with particular members. For example, a recruiter may be the searcher of member profiles in a social networking service. In such instances, the first machine learned model is trained to determine the probability that the recruiter will select a given member if the member's profile was returned as a search result, while the second machine learned model is trained to determine the probability that the member corresponding to the member profile will respond to the recruiter if contacted.

For purposes of this document, a member of a social networking service may be referred to as a candidate. A search result presented to a recruiter may be referred to as an impression. A communication from the recruiter to a candidate may be referred to as a send. A communication from the candidate to the recruiter in response to the send may be referred to as an accept. Generally, in the recruiter/member case, the probabilities may be described as:

p(send, accept|impression)→p(accept|send)·p(send|impression)

In an example embodiment, a feature vector may be created for each potential search result to be evaluated. The details of the feature vector will be described in more detail below. The feature vector is used as input to the first machine learned model and the second machine learned model to generate, for example, the probabilities on the right side of the above equation. In some example embodiments, this may be reflected mathematically as follows:

$$p(z=1\mid x) = p(z=1\mid x; y=1) * p(y=1\mid x) \sim =$$

$$\hat{p}(z=1\mid x; y=1)^a * \hat{p}(y=1\mid x)^b$$

where x is the feature vector for an impression, y is a binary variable indicating whether there is a send or not, and z is a binary variable indicating whether there is an accept.

p(·) represents probability of an event, \hat{p} denotes empirical estimates of p. The second step is an overrelaxation. Since \hat{p} is an inexact approximation, overrelaxation helps us alleviate the effect of inaccuracy in approximation. Overrelaxation together with score probabilistic calibration gives the flexibility to use models which can achieve better area under the curve of receiver operating characteristic in prediction but not better cross-entropy. In some example embodiments, alpha (a) in the following formula is around 0.5. Thus, the order preserving transform becomes:

$$\log p(z=1\mid x) = a*\log p(z=1\mid x; y=1) + b*\log p(y=1\mid x)$$

It should be noted that the term "social" as used throughout this document should be interpreted broadly to cover any type of grouping of online members of a service in which communications can be sent through the service. This is in contrast to a grouping of online members of services where communications are only sent through external means (e.g., traditional email, phone call, etc), and also in contrast to groupings of general Internet users.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
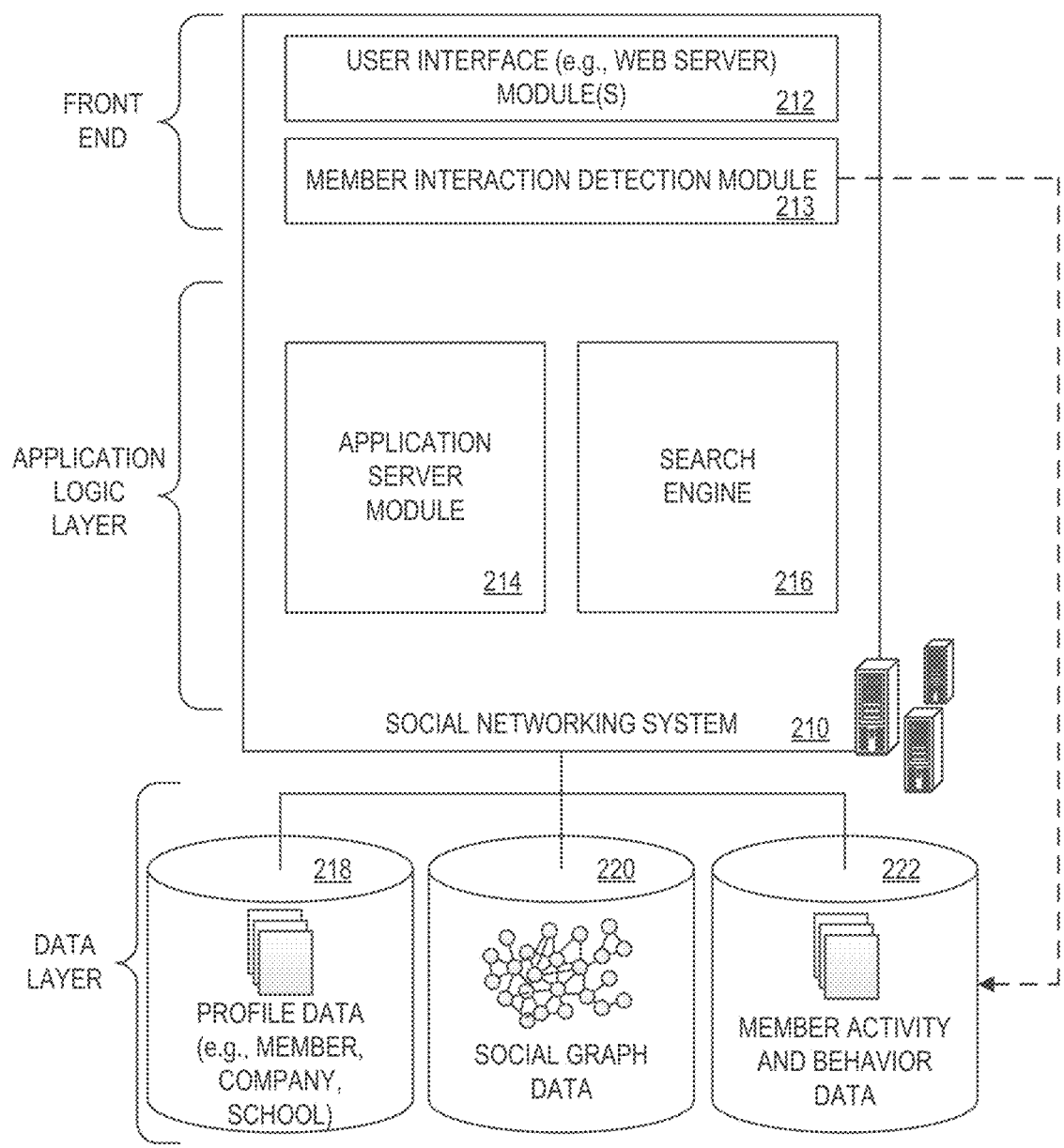
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
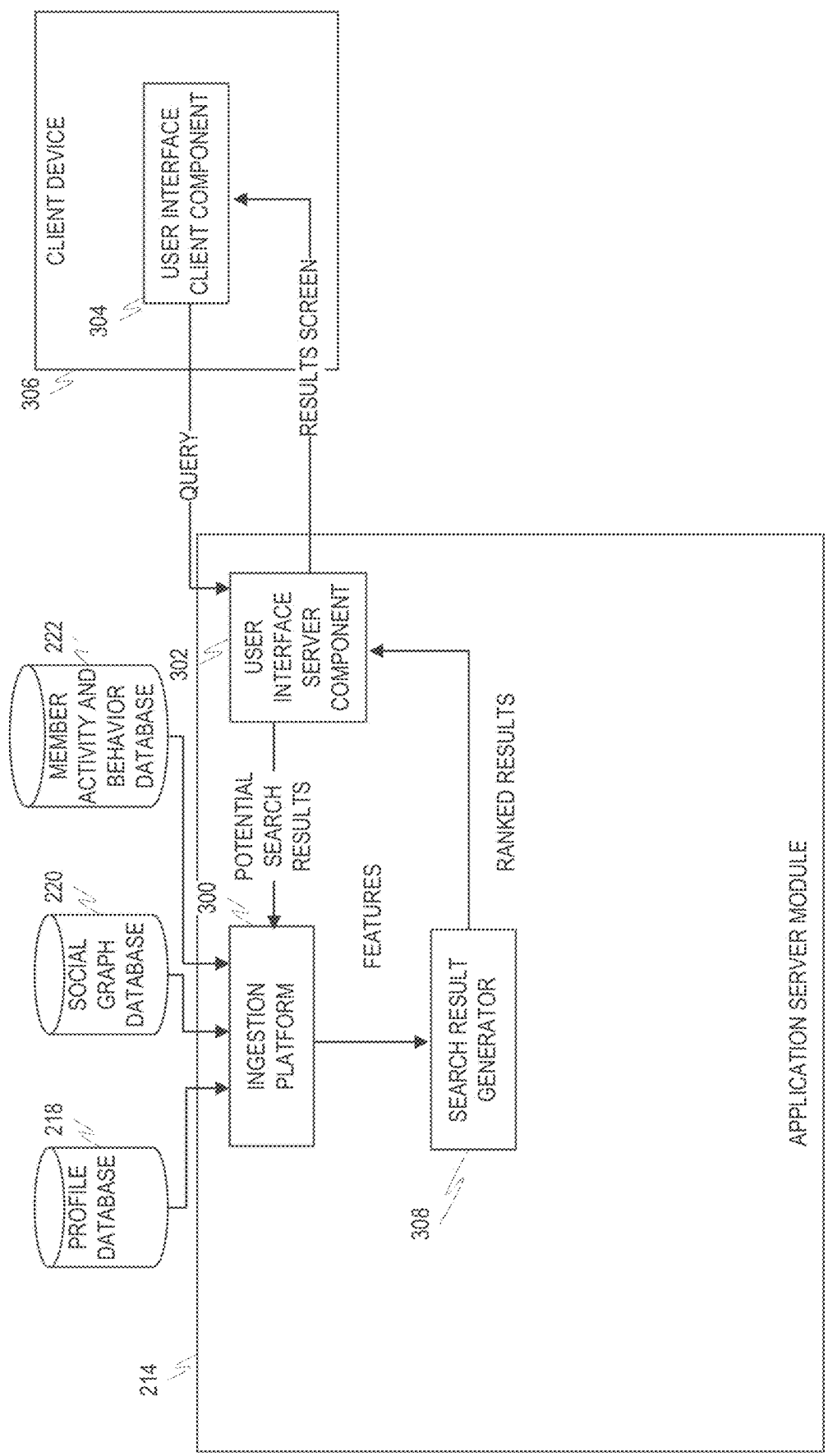
FIG. 3 is a block diagram illustrating an application server module of FIG. 2 in more detail.

FIG. 3 is a block diagram illustrating an application server module 214 of FIG. 2 in more detail. While in many embodiments the application server module 214 will contain many subcomponents used to perform various different actions within the social networking system, in FIG. 3 only those components that are relevant to the present disclosure are depicted. Here, an ingestion platform 300 obtains information from the profile database 218, the social graph database 220, and the member activity and behavior database 222 relevant to a query submitted by a searcher via a user interface server component 302. The user interface server component 302 communicates with a user interface client component 304 located on a client device 306 to obtain this identification information. The details of the user interface client component 304 will be described in more detail below, but generally a user, known hereafter as a searcher, of the user interface client component 304 may begin a search or otherwise cause generation of a search that provides search results of members with whom the searcher may wish to communicate. Information about each of these members is identified in the search results. The user interface server component 302 may generate potential search results based on the query and send identifications of these potential search results to the ingestion platform 300, which can use the identifications to retrieve the appropriate information corresponding to those potential search results from the profile database 218, the social graph database 220, and the member activity and behavior database 222. As will be discussed in more detail below, in some example embodiments, information about the searcher, such as a recruiter, may also be relevant to a prediction from the machine learned models described later. As such, an identification of the searcher may also be communicated via the user interface server component 302 to the ingestion platform 300, which can use the identifications to retrieve the appropriate information corresponding to the searcher from the profile database 218, the social graph database 220, and the member activity and behavior database 222.

The ingestion platform 300 may then provide the relevant information from the profile database 218, the social graph database 220, and the member activity and behavior database 222 to a search result generator 308, which acts to determine which of the potential search results to return and a ranking for those potential search results. In some example embodiments, this information is transmitted in the form of feature vectors. For example, each potential search result may have its own feature vector. In other example embodiments, the ingestion platform 300 sends raw information to the search result generator 308 and the search result generator 308 creates its own feature vectors from the raw information.

The ranked results may then be passed from the search result generator 308 to the user interface server component 302, which acts to cause the user interface client component 304 to display at least a portion of the ranked results.

Figure 4:
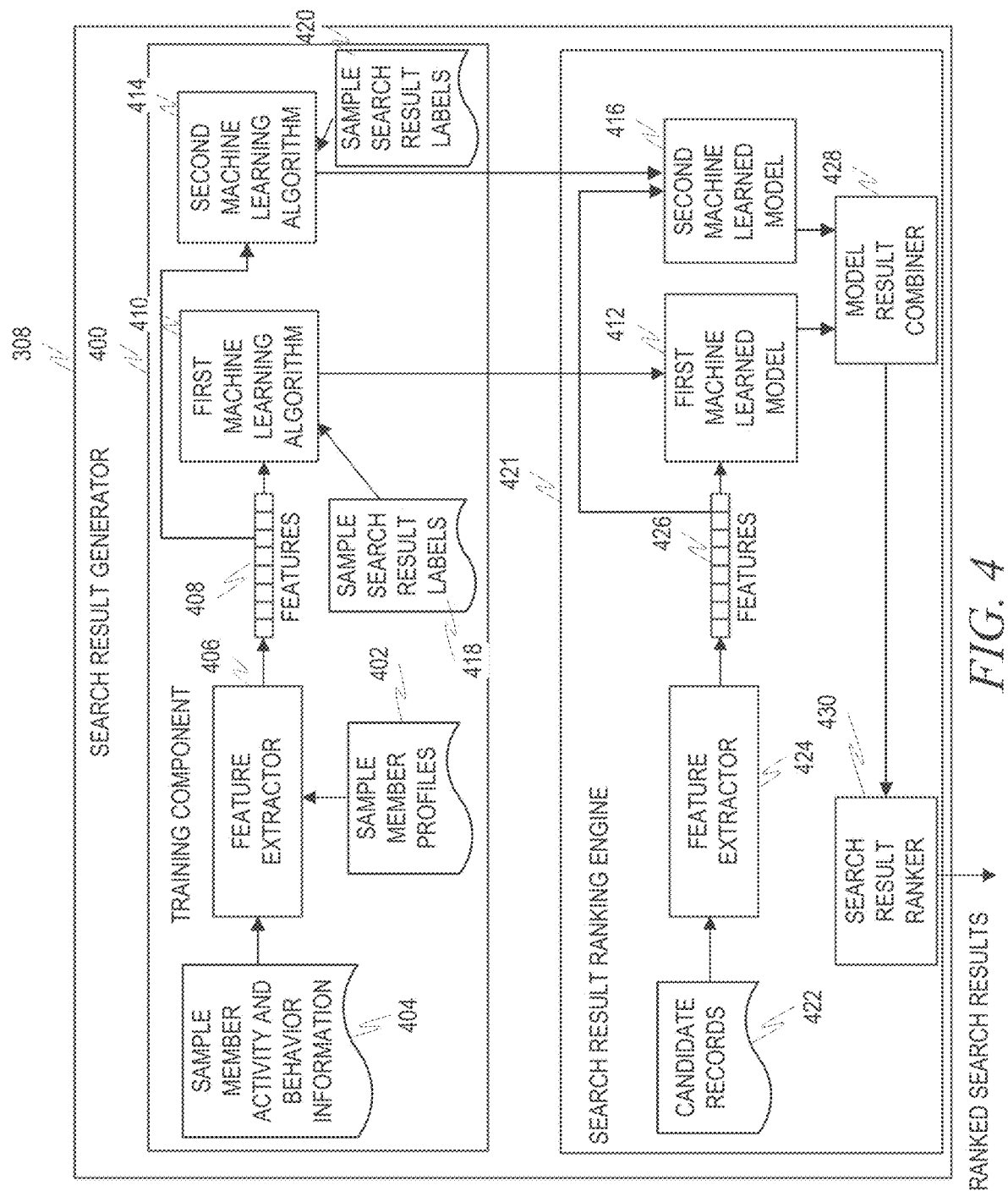
FIG. 4 is a block diagram illustrating the communication reply score search result generator 308 of FIG. 3 in more detail, in accordance with an example embodiment.

FIG. 4 is a block diagram illustrating the search result generator 308 of FIG. 3 in more detail, in accordance with an example embodiment. In a training component 400, sample member profiles 402 and sample member activity and behavior information 404 are fed to a feature extractor 406, which acts to extract curated features 408 from the sample member profiles 402 and sample member activity and behavior information 404. Different features may be extracted depending upon whether the member profile is assumed to be that of a prospective search result or that of a prospective searcher.

In an example embodiment, the curated features 408 are then used to as input to a first machine learning algorithm 410 to train a first machine learned model 412 to generate a probability that the searcher will select the corresponding potential search result. The curated features 408 may also be used as input to a second machine learning algorithm 414 to train a second machine learned model 416 to calculate a probability that a member associated with the corresponding potential search result will respond to a communication from the searcher. It should be noted that while this figure depicts one set of curated features 408 being used as input to both the first machine learning algorithm 410 and the second machine learning algorithm 414, in some example embodiments there may be different features for the different machine learning algorithms.

This training may include providing sample search result labels 418 to the first machine learning algorithm 410. Each of these sample search result labels 418 is a binary variable which indicates whether a searcher selected on the corresponding potential search result in the sample member activity and behavior information 404. Likewise, sample search result labels 420 may be provided to the second machine learning algorithm 414. Each of these sample search result labels 420 is a binary variable which indicates, in a case where a searcher sent an email to a candidate corresponding to the potential search result, whether the candidate replied or not.

In a search result ranking engine 421 candidate records 422 are fed to a feature extractor 424, which acts to extract curated features 426 from the candidate records 422. In some example embodiments, the candidate records 422 include member profile information and member activity and behavior information extracted by the ingestion platform 300, which can use the queries from the user interface server component 302 to retrieve the appropriate information corresponding to potential search results from the profile database 218, the social graph database 220, and the member activity and behavior database 222. The curated features 426 are then used as input to a the first machine learned model 412, which outputs a probability that the searcher will select the corresponding potential search result, and to a second machine learned model 416, which outputs a probability that a member associated with the corresponding potential search result will respond to a communication from the searcher. It should be noted that while this figure depicts one set of curated features 426 being used as input to both the first machine learned model 412 and the second machine learned model 416, in some example embodiments there may be different features for the different machine learned models.

These probabilities may be combined in a model result combiner 428. In some example embodiments, the model result combiner 428 acts to apply weights to the different probabilities when combining them. Indeed, in some further example embodiments, a third machine learning algorithm may be used to train a third machine learned model to optimize the assigned weights. Additionally, these weights may be dynamic in nature. For example, different weights could be applied based on the industry in which the recruiter operates.

The output of the model result combiner 428 is a combined probability, for each candidate search result, of both whether a searcher will select the candidate search result and a member corresponding to the candidate search result will respond to a communication from the searcher. This information may be passed to a search result ranker 430, which acts to rank the candidate search results based at least on these probabilities and to return the top n ranked candidate search results.

Thus, the searcher is presented with highly relevant search results based not only on the probability that the search result itself will be of interest to the searcher (based, for example, on the query itself and information about the searcher), but also that the member corresponding to the search result will respond to a communication from the searcher. Thus, for example, a candidate who might be of extremely high interest to a recruiter but who nevertheless may have a low chance of responding to a communication from the recruiter may not be presented, in favor of a candidate who is of lower interest to the recruiter but has a higher chance of responding to a communication from the recruiter.

Turning now to the creation of the feature vectors, as described earlier the feature vectors may be the same or may be different for the different machine learning algorithm inputs. What follows is a non-exhaustive list of various features that could be included in such feature vector(s).

In an example embodiment, the features may be divided into three classes: (1) query features, (2) result features, (3) searcher features, (4) query/result features, and (5) searcher/result features. A query feature is one that is drawn from the query itself, such as in cases where the query identifies a specific attribute of a search result, such as a first name, last name, company, or title.

A result feature is one that is drawn from the candidate result itself, such as industry, whether the candidate is considered an open candidate, a job seeker score for the candidate, a number of endorsers of the candidate query/result features, whether the candidate is an influencer, a profile quality score, whether a position or education field is empty, a number of current positions/previous positions, and educations in the search result, a communication delivery score (indicating general willingness to receive communications, as self-reported by members), a quality member score (score calculated by computing how complete a member profile is), a member engagement score, a historical click through rate for the search result from all recruiters, a historical action rate (e.g., number of all actions taken on the result divided by number of impressions of the result in the last three months), number of communications received, number of communications accepted, a decision maker score, the amount of time since the candidate indicated he or she is an open candidate, and whether the candidate has applied for a job.

A searcher feature is one that is drawn from information about the searcher him or herself, such as industry, historical rate of selection of result, and location.

A query/result feature is one that is drawn from a combination of the query and the candidate result, such as number of terms in the query that match some text in the candidate result; number of terms in the query that match specific text fields in the candidate result; the fraction of terms in the query that match some text in the candidate result; the fraction of terms in the query that match specific text fields in the candidate result; the frequency that terms in the query match some text in the candidate result; the frequency that terms in the query match specific text fields in the candidate result; if the query contains a first name and a last name and the candidate result is an influencer, then whether the candidate results matches the first name and last name; whether a position in the query matches a position in the candidate result; whether a title in the query matches a title in the candidate result; Term-Frequency-Inverse Document Frequency score; BM25F score; relative importance of matched terms with respect to query itself and the fields of the candidate result (e.g., number of matched terms $^2$/(number of terms in the query*number of terms in the field), generated affinity score created by product of query and member embeddings (similarity between search query and candidate result); raw query and candidate result matching features for schools; BM25 for current position summary divided by past position summary; clicks by candidate on advertisements from company employing searcher, if the query is a sample job posting; similarity between fields in the job posting and fields in the candidate result; similarity score between the candidate result and weighted query terms, with the weights learned online; and deep embedding features for title, skill, company, and field of study.

A searcher/result feature is one that is drawn from a combination of the searcher and the candidate result, such as network distance (social network degrees of separation between the searcher and the candidate result), number of common connections, location match, number of matching fields (e.g., current company, past company, school, industry), match score (number of matches squared divided by the product of searcher field size and result field size), recruiter-candidate affinity score (using, e.g., history data for sends and accepts between searcher and candidate result), number of common groups, and company interest score.

The first, second, and third machine learning algorithms may be selected from among many different potential supervised or unsupervised machine learning algorithms. Examples of supervised learning algorithms include artificial neural networks. Bayesian networks, instance-based learning, support vector machines, random forests, linear classifiers, quadratic classifiers, k-nearest neighbor, decision trees, other tree models, and hidden Markov models. Examples of unsupervised learning algorithms include expectation-maximization algorithms, vector quantization, and information bottleneck method. In an example embodiment, a binary logistical regression model is used. Binary logistic regression deals with situations in which the observed outcome for a dependent variable can have only two possible types. Logistic regression is used to predict the odds of one case or the other being true based on values of independent variables (predictors). In an example embodiment, the machine learning algorithm(s) may be probabilistic.

Figure 5:
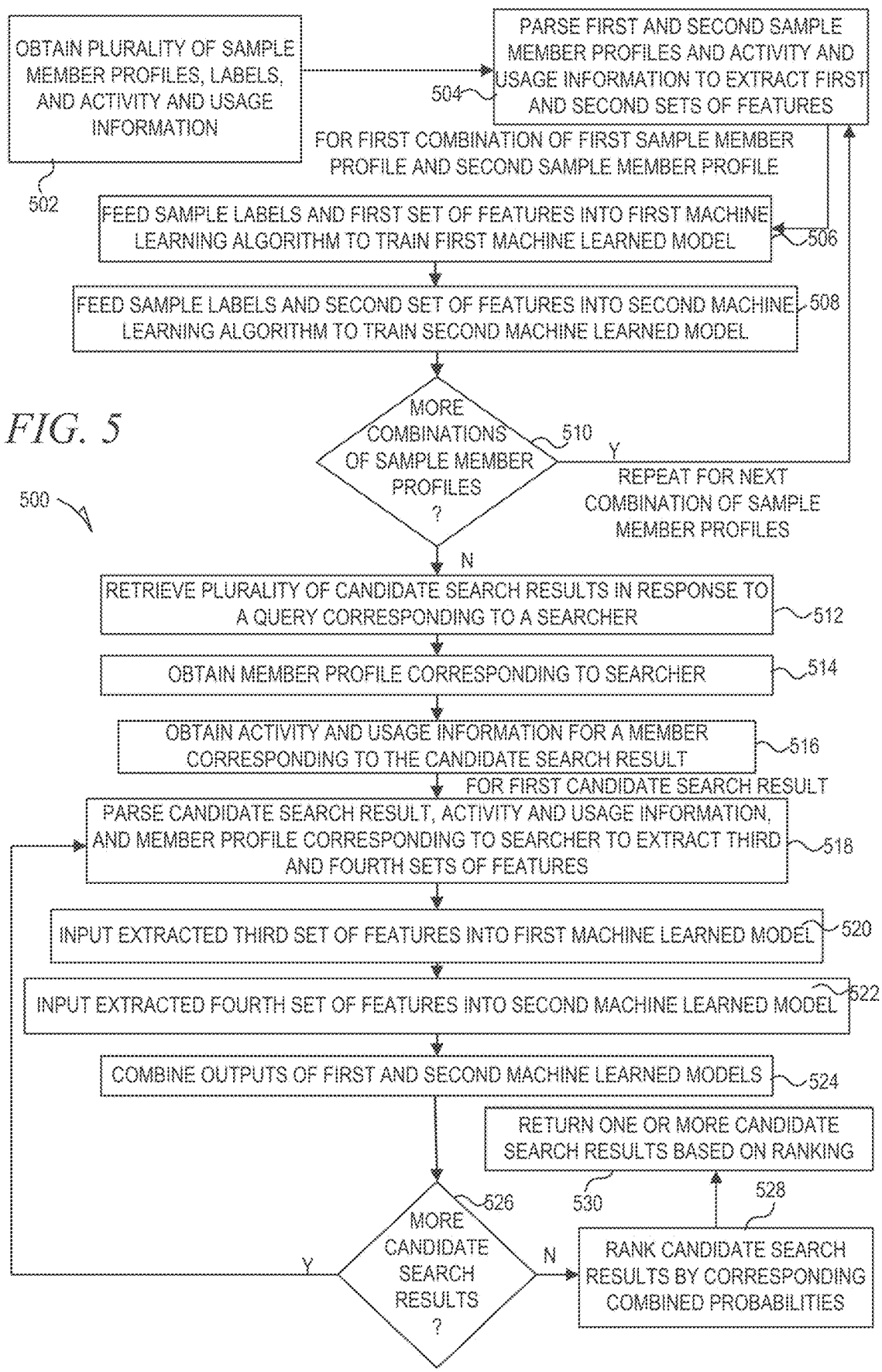
FIG. 5 is a flow diagram illustrating a method 500 for returning search results in an online computer system in accordance with an example embodiment.

FIG. 5 is a flow diagram illustrating a method 500 for returning search results in an online computer system in accordance with an example embodiment. In a training phase, at operation 502, a plurality of sample member profiles of members of the social networking service are retrieved along with a plurality of sample member labels and activity and usage information pertaining to actions taken by those members on the social networking service. Then a loop is begun for each combination of a first and second sample member profile in the plurality of sample member profiles. At operation 504, the first sample member profile, the second sample member profile, and the activity and usage information pertaining to actions taken by those members on the social networking service are parsed to extract a third set of one or more features and a fourth set of one or more features. Then, at operation 506, sample member labels and the extracted third set of features are fed into a first machine learning algorithm to train the first machine learned model to output a probability that a searcher having the second sample member profile will select a potential search result corresponding to the first sample member profile. At operation 508, sample member labels and the extracted fourth set of features are fed into a second machine learning algorithm to train the second machine learned model to output a probability that a member corresponding to the first sample member profile will respond to a communication from a searcher having the second sample member profile. At operation 510, it is determined if there are any more combinations of first sample member profile and second sample member profile in the plurality of sample member profiles. If so, then the method 500 loops back to operation 504 for the next combination of first sample member profile and second sample member profile.

If not, then the training phase is complete and a runtime phase begins. At operation 512, a plurality of candidate search results is retrieved in response to a query corresponding to a searcher. At operation 514, a member profile, in the social networking service, corresponding to the searcher is obtained. Then a loop is begun for each candidate search result in the plurality of candidate search results. At operation 516, activity and usage information for a member corresponding to the candidate search result is obtained. At operation 518, the candidate search result, the activity and usage information for the member corresponding to the candidate search result, and the member profile corresponding to the searcher are parsed to extract a first set of one or more features and a second set of one or more features. At operation 520, the extracted first set of one or more features is fed into the first machine learned model. At operation 522, the extracted second set of one or more features into the second machine learned model. At operation 524, outputs of the first machine learned model and the second machine learned model are combined to form a combined probability for the candidate search result. At operation 526, it is determined if there are any more candidate search results in the plurality of candidate search results. If so, then the method 500 loops back to operation 518 for the next candidate search result.

If not, then at operation 528, the plurality of candidate search results are ranked by their corresponding combined probabilities. At operation 530, one or more of the plurality of candidate search results are returned based on the ranking.

Figure 6:
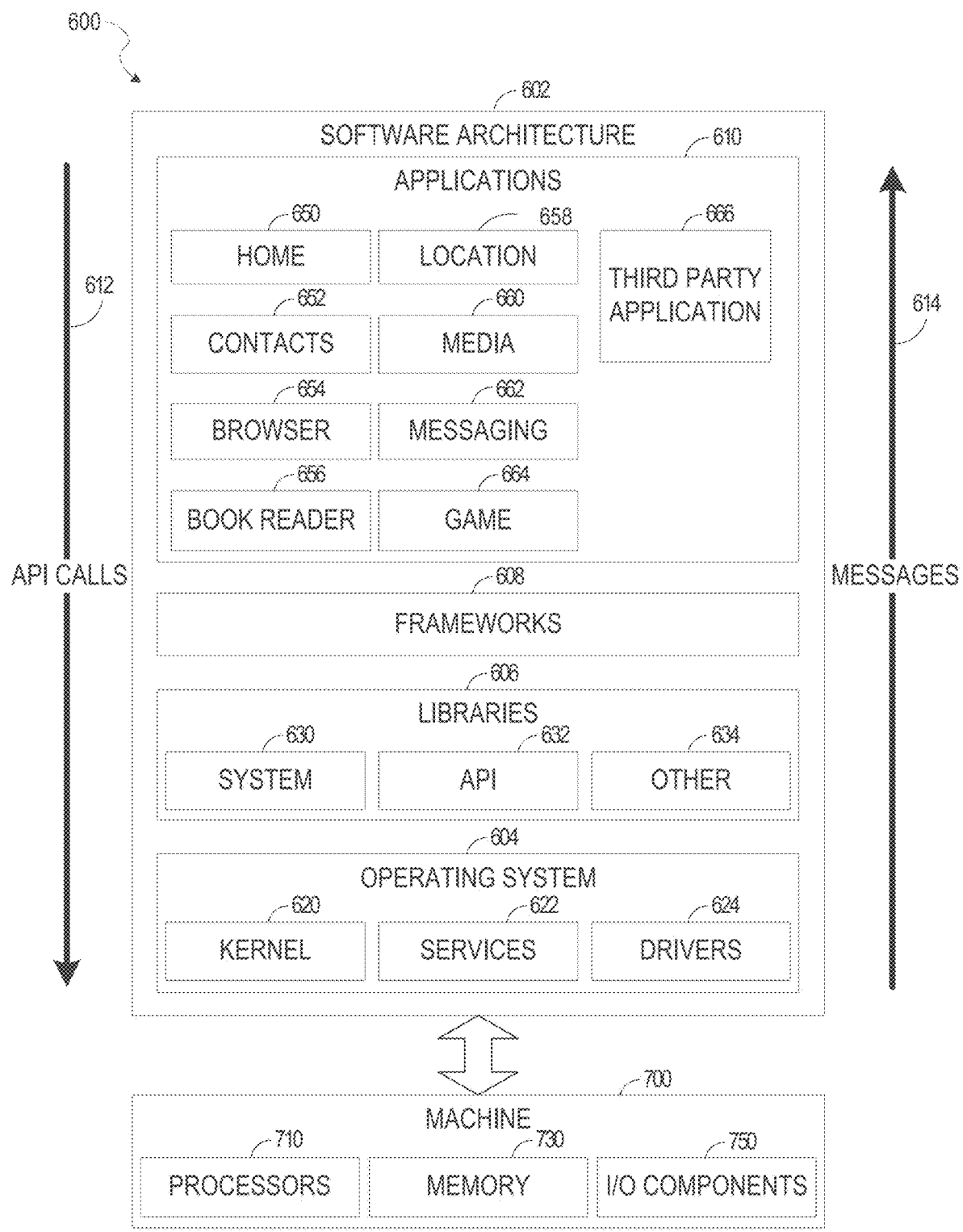
FIG. 6 is a block diagram 600 illustrating an architecture of software 602, which can be installed on any one or more of the devices described above.

FIG. 6 is a block diagram 600 illustrating an architecture of software 602, which can be installed on any one or more of the devices described above. FIG. 6 is merely a non-limiting example of a software architecture, and it will be appreciated that many other architectures can be implemented to facilitate the functionality described herein. In various embodiments, the software 602 is implemented by hardware such as a machine 700 of FIG. 7 that includes processors 710, memory 730, and input/output (I/O) components 750. In this example architecture, the software 602 can be conceptualized as a stack of layers where each layer may provide a particular functionality. For example, the software 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system or platform.

In an example embodiments, the applications 610 include a home application 650, a contacts application 652, a browser application 654, a book reader application 656, a location application 658, a media application 660, a messaging application 662, a game application 664, and a broad assortment of other applications such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
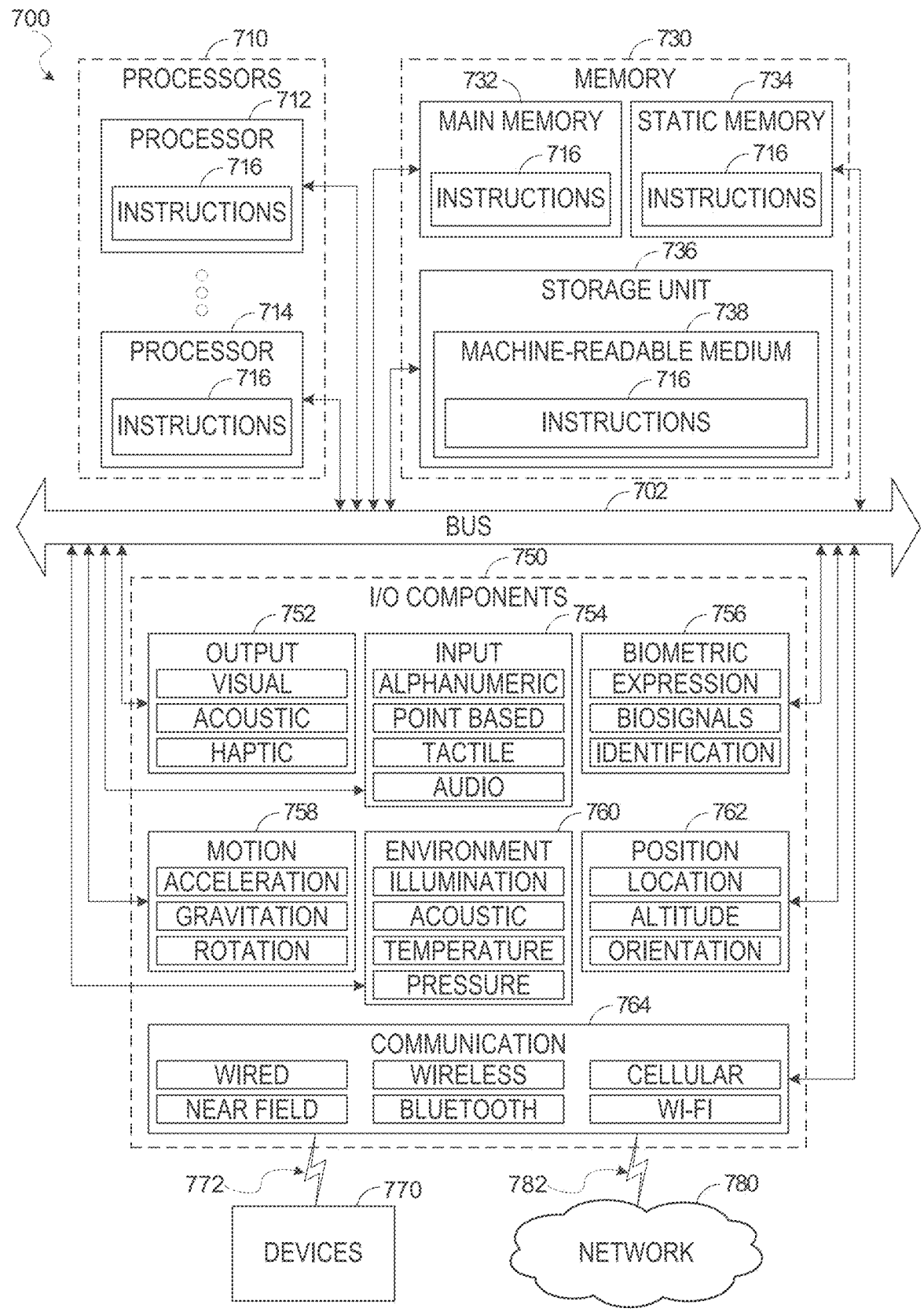
FIG. 7 illustrates a diagrammatic representation of a machine 700 in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory 730 may include a main memory 732, a static memory 734, and a storage unit 736, all accessible to the processors 710 such as via the bus 702. The main memory 730, the static memory 734, and storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, Near Field Communication (NFC) components. Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix. Dataglyph. MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or storage unit 736 may store one or more sets of instructions and data structures (e.g., software) embodying or utilized by any one or more of the methodologies or functions described herein. These instructions (e.g., the instructions 716), when executed by processor(s) 710, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices, magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS). High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system for returning search results in an online computer system, the system comprising:
   a non-transitory computer readable medium having instructions stored there on, which, when executed by a processor, cause the system to:
   train a first machine learned model using training data, the first machine learned model being a neural network;
   obtain a plurality of potential search results in response to a query corresponding to a first searcher;
   obtain a first member profile, in a social networking service, corresponding to the first searcher;
   for each potential search result from the plurality of potential search results:
   obtain activity and usage information for a member corresponding to the potential search result;
   parse the potential search result, the activity and usage information for the member corresponding to the potential search result, and the first member profile corresponding to the first searcher to extract a first set of one or more features and a second set of one or more features;
   feed the extracted first set of one or more features into a first machine learned model trained to output a probability that a searcher having a member profile will select a potential search result;
   feed the extracted second set of one or more features into a second machine learned model trained to output a probability that a member corresponding to the potential search result will respond to a communication from a searcher;
   combine outputs of the first machine learned model and the second machine learned model to form a combined probability for the potential search result, the combined probability indicating both a likelihood that the potential search result will be of interest to the first searcher and the member corresponding to the potential search result will respond to a communication from the first searcher;
   rank the plurality of potential search results by their corresponding combined probabilities; and
   return one or more of the plurality of potential search results based on the ranking.

2. The system of claim 1, wherein the instructions further cause the system to:
   retrieve a plurality of sample member profiles of members of the social networking service, a plurality of sample member labels, and activity and usage information pertaining to actions taken by those members on the social networking service;
   for each combination of a first and second sample member profile in the plurality of sample member profiles:
   parse the first sample member profile, the second sample member profile, and the activity and usage information pertaining to actions taken by those members on the social networking service to extract a third set of one or more features and a fourth set of one or more features;
   feed sample member labels and the extracted third set of features into a first machine learning algorithm to train the first machine learned model to output a probability that a searcher having the second sample member profile will select a potential search result corresponding to the first sample member profile; and feed sample member labels and the extracted fourth set of features into a second machine learning algorithm to train the second machine learned model to output a probability that a member corresponding to the first sample member profile will respond to a communication from a searcher having the second sample member profile.

3. The system of claim 1, wherein the first set of features is identical to the second set of features.

4. The system of claim 2, wherein the third set of features is identical to the fourth set of features.

5. The system of claim 1, wherein the combing outputs includes applying a separate weight to the outputs of the first machine learned model and the second machine learned model.

6. The system of claim 5, wherein the weights are dynamically determined based on information about the searcher.

7. The system of claim 5, wherein the weights are determined using a third machine learning algorithm.

8. A computer-implemented method for returning search results in an online computer system, the method comprising:

training a first machine learned model using training data, the first machine learned model being a neural network;

obtaining a plurality of potential search results in response to a query corresponding to a first searcher;

obtaining a first member profile, in a social networking service, corresponding to the first searcher;

for each potential search result from the plurality of potential search results:

obtaining activity and usage information for a member corresponding to the potential search result;

parsing the potential search result, the activity and usage information for the member corresponding to the potential search result, and the first member profile corresponding to the first searcher to extract a first set of one or more features and a second set of one or more features;

feeding the extracted first set of one or more features into a first machine learned model trained to output a probability that a searcher having a member profile will select a potential search result;

feeding the extracted second set of one or more features into a second machine learned model trained to output a probability that a member corresponding to the potential search result will respond to a communication from a searcher;

combining outputs of the first machine learned model and the second machine learned model to form a combined probability for the potential search result, the combined probability indicating both a likelihood that the potential search result will be of interest to the first searcher and the member corresponding to the potential search result will respond to a communication from the first searcher;

ranking the plurality of potential search results by their corresponding combined probabilities; and returning one or more of the plurality of potential search results based on the ranking.

9. The method of claim 8, further comprising:

retrieving a plurality of sample member profiles of members of the social networking service, a plurality of sample member labels, and activity and usage information pertaining to actions taken by those members on the social networking service;

for each combination of a first and second sample member profile in the plurality of sample member profiles:

parsing the first sample member profile, the second sample member profile, and the activity and usage information pertaining to actions taken by those members on the social networking service to extract a third set of one or more features and a fourth set of one or more features;

feeding sample member labels and the extracted third set of features into a first machine learning algorithm to train the first machine learned model to output a probability that a searcher having the second sample member profile will select a potential search result corresponding to the first sample member profile; and feeding sample member labels and the extracted fourth set of features into a second machine learning algorithm to train the second machine learned model to output a probability that a member corresponding to the first sample member profile will respond to a communication from a searcher having the second sample member profile.

10. The method of claim 8, wherein the first set of features is identical to the second set of features.

11. The method of claim 9, wherein the third set of features is identical to the fourth set of features.

12. The method of claim 8, wherein the combing outputs includes applying a separate weight to the outputs of the first machine learned model and the second machine learned model.

13. The method of claim 12, wherein the weights are dynamically determined based on information about the searcher.

14. The method of claim 12, wherein the weights are determined using a third machine learning algorithm.

15. A non-transitory machine-readable storage medium comprising instructions, which when implemented by one or more machines, cause the one or more machines to perform operations comprising:

training a first machine learned model using training data, the first machine learned model being a neural network;

obtaining a plurality of potential search results in response to a query corresponding to a first searcher;

obtaining a first member profile, in a social networking service, corresponding to the first searcher;

for each potential search result from the plurality of potential search results:

obtaining activity and usage information for a member corresponding to the potential search result;

parsing the potential search result, the activity and usage information for the member corresponding to the potential search result, and the first member profile corresponding to the first searcher to extract a first set of one or more features and a second set of one or more features;

feeding the extracted first set of one or more features into a first machine learned model trained to output a probability that a searcher having a member profile will select a potential search result;

feeding the extracted second set of one or more features into a second machine learned model trained to output a probability that a member corresponding to the potential search result will respond to a communication from a searcher;

combining outputs of the first machine learned model and the second machine learned model to form a combined probability for the potential search result, the combined probability indicating both a likelihood that the potential search result will be of interest to the first searcher and the member corresponding to the potential search result will respond to a communication from the first searcher;

ranking the plurality of potential search results by their corresponding combined probabilities; and returning one or more of the plurality of potential search results based on the ranking.

16. The non-transitory machine-readable storage medium of claim 15, further comprising:

retrieving a plurality of sample member profiles of members of the social networking service, a plurality of sample member labels, and activity and usage information pertaining to actions taken by those members on the social networking service;

for each combination of a first and second sample member profile in the plurality of sample member profiles:

parsing the first sample member profile, the second sample member profile, and the activity and usage information pertaining to actions taken by those members on the social networking service to extract a third set of one or more features and a fourth set of one or more features;

feeding sample member labels and the extracted third set of features into a first machine learning algorithm to train the first machine learned model to output a probability that a searcher having the second sample member profile will select a potential search result corresponding to the first sample member profile; and feeding sample member labels and the extracted fourth set of features into a second machine learning algorithm to train the second machine learned model to output a probability that a member corresponding to the first sample member profile will respond to a communication from a searcher having the second sample member profile.

17. The non-transitory machine-readable storage medium of claim 15, wherein the first set of features is identical to the second set of features.

18. The non-transitory machine-readable storage medium of claim 16, wherein the third set of features is identical to the fourth set of features.

19. The non-transitory machine-readable storage medium of claim 15, wherein the combing outputs includes applying a separate weight to the outputs of the first machine learned model and the second machine learned model.

20. The non-transitory machine-readable storage medium of claim 19, wherein the weights are dynamically determined based on information about the searcher.

* * * * *